United States Patent [19]

Treiber et al.

[11] 3,985,605

[45] Oct. 12, 1976

[54] LABELING METHOD AND APPARATUS

[75] Inventors: Fritz F. Treiber, Dayton; Dallas A. Margraf, Bellbrook, both of Ohio

[73] Assignee: Hobart Corporation, Troy, Ohio

[22] Filed: Apr. 30, 1975

[21] Appl. No.: 573,597

[52] U.S. Cl. .................................. 156/384; 156/559

[51] Int. Cl.$^2$ .......................................... B32B 31/00

[58] Field of Search ........... 156/362, 363, 364, 384, 156/559, 277

[56] References Cited

UNITED STATES PATENTS

| | | | |
|---|---|---|---|
| 3,264,161 | 2/1966 | Stremke | 156/362 |
| 3,301,733 | 1/1967 | West et al. | 156/363 |
| 3,321,105 | 5/1967 | Marano | 156/584 |
| 3,524,786 | 8/1970 | Spokowski et al. | 156/362 |
| 3,577,296 | 5/1971 | Phillips | 156/277 |

*Primary Examiner*—Douglas J. Drummond
*Attorney, Agent, or Firm*—Biebel, French & Nauman

[57] ABSTRACT

A label applicator applies a human readable label and a machine readable label to opposite sides of a package such that the position of the human readable label on one side provides an indication of the position of the machine readable label on the opposite side. Proper positioning of a package for application of the machine readable label is sensed when the package is positioned either automatically or manually. A printer prints the machine readable label and ejects it into a catcher where the label is held prior to its application to a package. The label application process is monitored by an interlock which signals the failure of the applicator head to pick up a label from the catcher.

3 Claims, 20 Drawing Figures

FIG-1
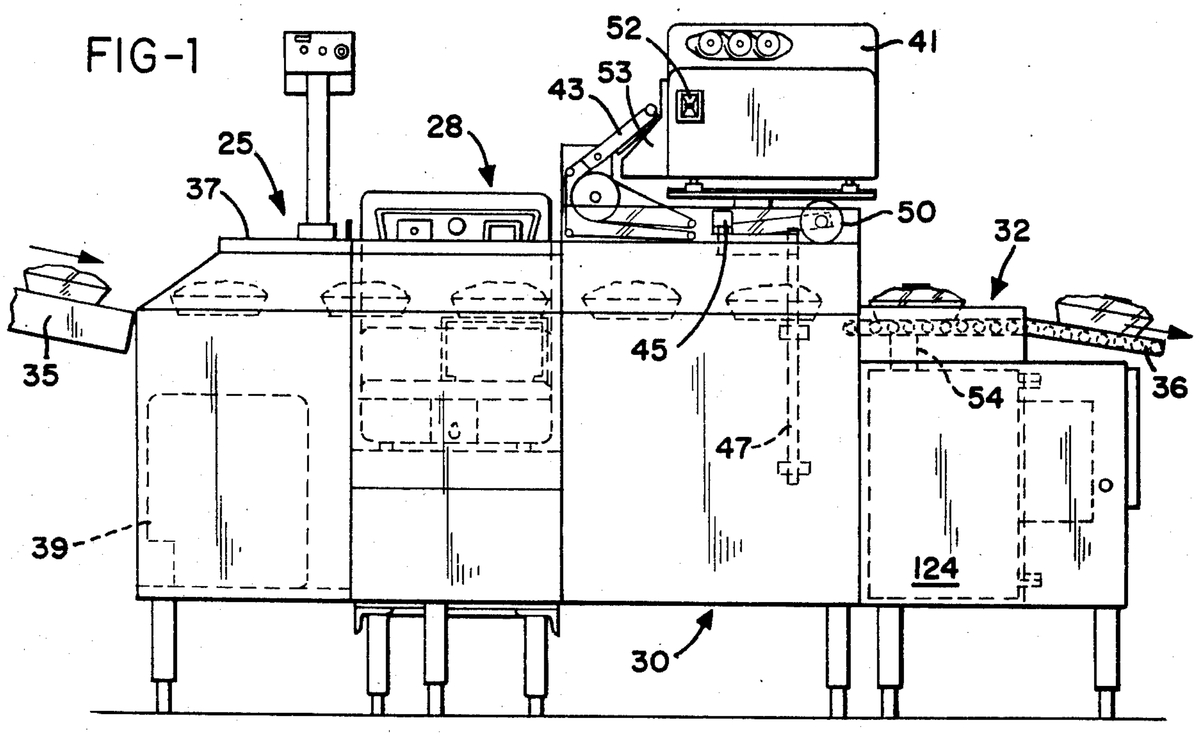
FIG-2
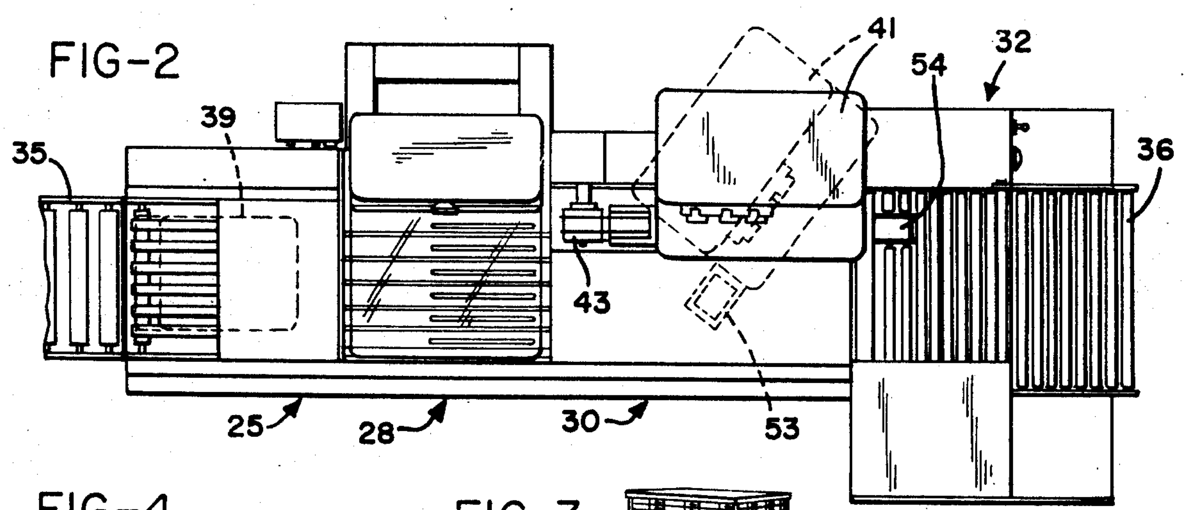
FIG-4
200542 205899
FIG-3
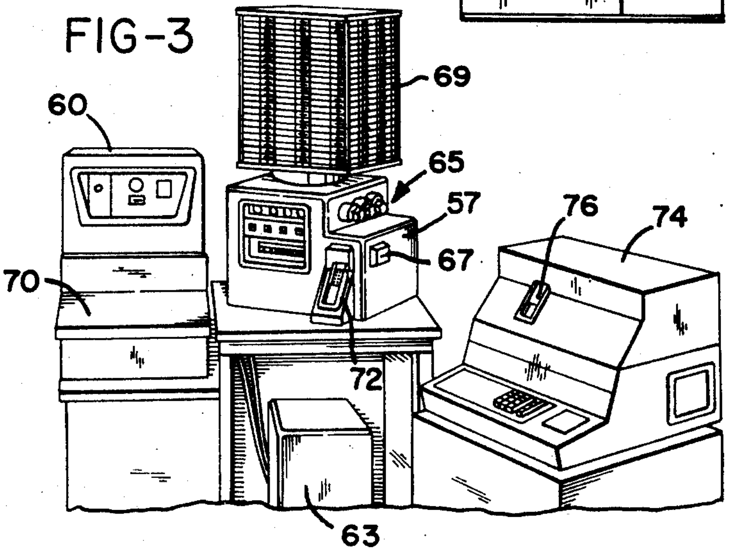
FIG-5
STORE
VALUE
WT. LBS.NET $1.25 PRICE LB.
1.25 1.00
PORK CHOPS

LABELING METHOD AND APPARATUS

CROSS-REFERENCE TO RELATED APPLICATIONS

This application is related to copending application Ser. No. 573,594 and Ser. No. 573,595, all filed on the same date as this application and assigned to the same assignee.

BACKGROUND OF THE INVENTION

This invention relates to a method and apparatus, for the application of labels to food packages which are to be sold in grocery stores and supermarkets. The Universal Product Code (UPC) was recently adopted by the retail food industry to allow an automated checkout arrangement in grocery stores and supermarkets. The code is a bar code pattern which, for prepackaging goods, specifies in machine readable notation the manufacturer and the item. With prepackaged products this code is typically printed on a side of the product package. At the checkout stand, the checker passes the bar code symbols over a scanning arrangement, of a type known in the art. The scanning arrangement reads the coded information and transmits it to a computer which determines the cost of the item being sold and supplies this information to checkout register for totalization. Additionally, the computer keeps track of the items sold for inventory purposes. Such a system eliminates the need for price marking each item and speeds the checkout procedure.

Since, however, between 10 and 30% of items sold in grocery stores are random weight products (e.g., meat, produce, and cheese), for an automated checkout system to be employed effectively, provision for the application of UPC labels to such products must be made. In presently used systems, such items have typically been weighed in the supermarket and a human readable label printed specifying the total weight, the cost per unit weight, and the total cost of the product. The label is applied to the top of the product package, either manually or automatically. An example of a semi-automatic system is disclosed in U.S. Pat. No. 3,557,353, issued Jan. 19, 1971, which shows a weighing scale, an associated price calculating computer, and label printer. The type of item being weighed is indicated to the printer by a commodity key which is inserted into the printer and bears the name of the product. A similar system of automatic labeling of a large number of packages is shown in U.S. Pat. No. 3,732,966. There the scale computer and printer are associated with a conveyer mechanism which moves the article to a position where a human readable label is automatically applied to the upper surface of the package.

A need has developed, therefore, for an apparatus which is compatible with pre-existing labeling apparatus and which is capable of printing and applying a label with UPC or other code to random weight products in the grocery store or in other weighing and labeling situations.

The UPC random weight symbol format specified by the Uniform Grocery Product Code Council is specified in the publications, *Approaches to UPC Implementation*, published by Supermarket Institute Inc., copyright 1974, and UPC Symbol Specification published by Distribution Codes Inc., Alexandria, Va. as administrator for the Uniform Product Code Council; this code requires a designator that the package is a random weight item. In the random weight stituations, four of the last five digits of the UPC code are used for the price of the item and six other digits may be used to specify the type of commodity in the package. Also in the random weight situation, the final digit position on the label is a check character. This check character is related mathematically to the information bearing characters and thus provides verification of scanner readout. It is desirable that the UPC label be applied to random weight packages in a location that facilitates checkout procedures, i.e., a location which is both accessable and predictable.

SUMMARY OF THE INVENTION

A label applicator for applying to a package a human readable label upon which is printed the package weight, the cost per unit weight, and the total cost of the packaged item, and for applying a related machine readable label to the package, comprises means for applying the machine readable label substantially opposite the human readable label such that the position of the human readable label provides an indication of the position of the machine readable label. The human readable label and the machine readable label may typically be applied to the upper and lower surfaces of a package, respectively. This label arrangement allows the convenient positioning of a package over a scanner so the machine readable label may be easily scanned and information contained therein supplied to an automated checkout arrangement. Proper positioning of a package for application of a machine readable label is sensed, and results in momentary actuation of a package indicating switch. In this actuation a switch lever arm, which is spring biased to a first position, is moved from this first position to a second position. An actuator means, adjacent the lever arm, moves the lever arm in response to either a first sensing means detecting the automatic positioning of a package by a conveyer or a second package sensing means detecting when the package is manually positioned.

A printer means prints and ejects the appropriate machine readable label into a catcher. The machine readable label is applied to the bottom of the package, after it is properly positioned, by an applicator head, which remains the label from the catcher. The applicator head moves from an initial retracted position past the catcher means where it grasps the label, and applies it to the bottom of the package through an aperture in the conveyer.

The label catcher comprises left and right guide walls which at their top are separated by a distance slightly greater than the width of a label. The inner surfaces of these guide walls are slightly tapered inward, tending to converge at the bottoms of the guide walls. Label support means are located beneath the guide walls in the form of two knife edge surfaces for supporting the label. A label stop prevents labels from moving beyond the label catcher as they are ejected from the printer. The label applicator head grasps the label by means of suction applied as the applicator moves from its initial position to its extended position an interlock senses failure to grasp the label by sensing the vacuum line pressure. Absence of a human readable label is also monitored by an interlock.

Accordingly it is an object of this invention to provide apparatus for applying to a package a machine readable label and a human readable label in registration with each other; further to provide a method for applying such labels so that such registration may be used to position the machine readable label for scanning; to provide an arrangement for sensing when a package is properly positioned for the application of such labels; to provide a novel label catcher for holding a label after it is printed and prior to its application to a package by an applicator; and to provide an interlock for indicating the failure of the apparatus to apply a label to a package.

Other objects and advantages of the invention will be apparent from the following description, the accompanying drawings and the appended claims.

BRIEF DESCRIPTION OF THE DRAWINGS

FIG. 1 is a side elevational view of the apparatus encompassing the preferred embodiment of the invention;

FIG. 2 is a plan view of the apparatus of FIG. 1;

FIG. 3 is a perspective view of apparatus for performing the method of the present invention manually;

FIG. 4 illustrates a Universal Product Code label;

DETAILED DESCRIPTION OF THE INVENTION

Figure 6:
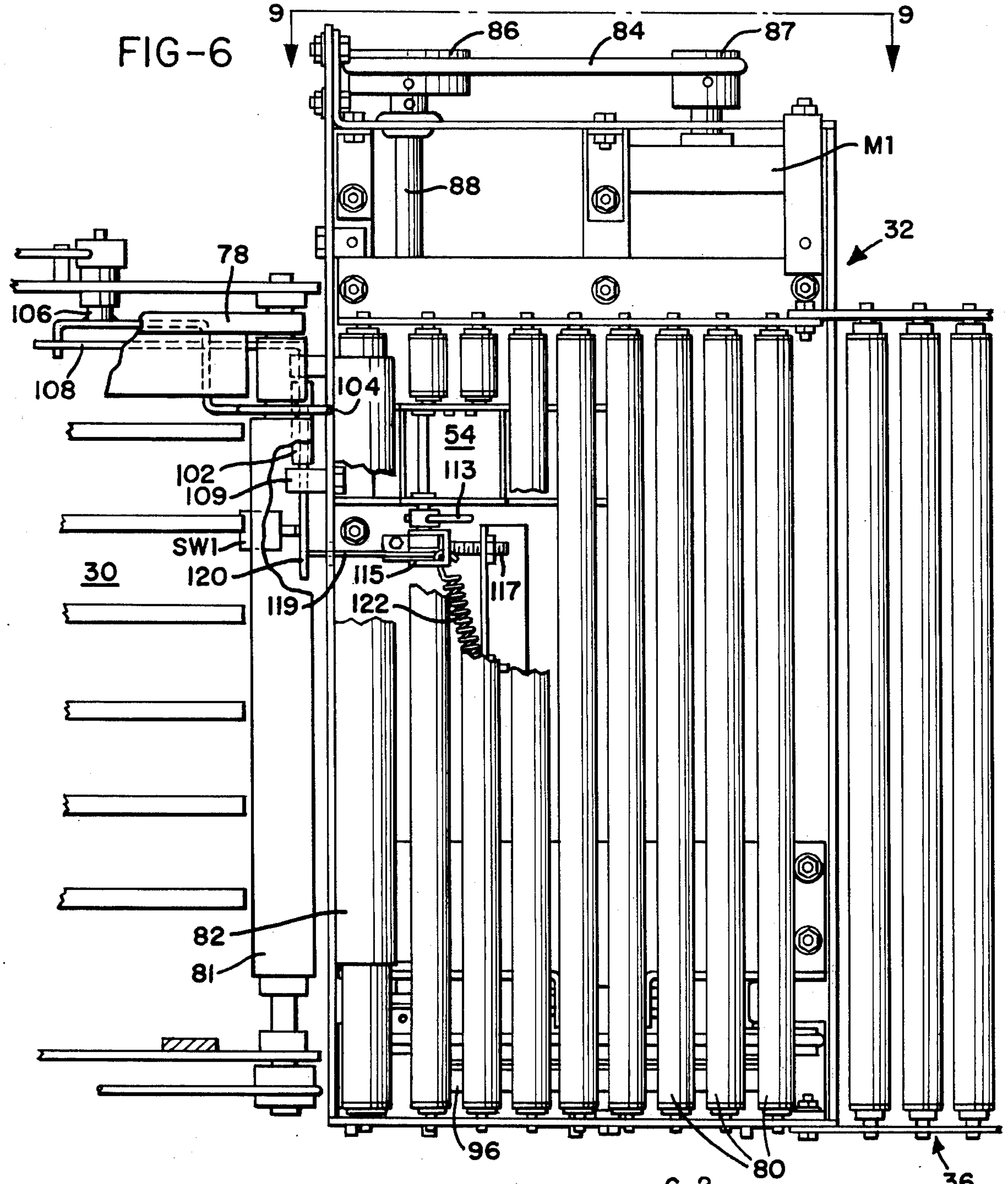
FIG. 6 is a plan view of the UPC label applicator section of the machine, with parts of the conveyer rollers broken away to show other structures.

With reference to FIG. 1 of the drawings, it will be seen that a package handling arrangement comprises loading and spacing station 25, weighing station 28, and human readable label printing and applying station 30, and a machine readable label printing and applying station 32. Feeding and removing conveyers 35 and 36, respectively, of conventional construction, may be provided for delivering packages to the handling arrangement and removing them therefrom. Stations 25, 28, and 30 are provided with covers such as the tunnel-like cover 37 for station 25; the cover for station 28 being also attached to the scale platter for use in manual weighing. Packages delivered by the feed conveyer 35 are properly positioned and spaced in the loading station 25, weighed at the weighing station 28, and then carried to the human readable label printing and applying station 30. A computer 39 computes the total value of the article being weighed, based upon its weight and predetermined price per unit weight, and stores this information for future use. Thereafter, this information is transferred to a printer 41 which prints the computed price, and usually the weight and price per unit of weight, in human readable form on a label.

Transport 43 then conveys the printed label from the printer 41 to a label head 45 for application to the upper surface of the weighed package. The label applicator head 45 is mechanically linked to arm 47 which is moved vertically by a cam arrangement (not shown) in synchronism with the package conveyer so as to properly time the application of the human readable label to the package. Roller 50 then presses the label against the package to insure firm attachment. Details of all of these mechanisms are disclosed in U.S. Pat. No. 3,732,966. The package then is moved to the machine readable label printing and applying station 32 for application of a machine readable label, preferably printed in the Universal Product Code (UPC). The machine readable or UPC label is applied after the package has been moved down the conveyer a distance of several package lengths; since the information for printing both the human readable and machine readable labels is available at the time of printing the human readable label, some accommodation for delay between applying of human readable and machine readable labels and the packages which may be en route between the two labeling stations is necessary.

This accommodation may for example be accomplished by printing both labels simultaneously together with retaining the two or three labels assigned to en route packages until the proper time. In the preferred embodiment of the invention however, this accommodation is achieved electronically by storing the human readable information in a buffer memory during en route time between labeling stations. With this arrangement the UPC label is not printed until the package has arrived at the UPC labeling station, and the printing of unused labels is avoided with en route packages are absent. The buffer memory in this arrangement provides label information storage for the three en route packages possible in the preferred embodiment.

The machine readable label is applied to the bottom of the weighed package, and as described below, specifies the total price of the package and the type of product. The printer 41 includes a commodity key receptacle 52 which receives a commodity identification key (not shown). This key includes a commodity identification printing plate specifying the type of product and also machine readable coding of this information. Details of the printer and its use with the commodity key are described in U.S. Pat. No. 3,104,806.

The automated system of FIGS. 1 and 2 may also be used in a manual operating mode. For example, if the package to be processed is too large to move beneath cover 37, it may be weighed by hand at weighing station 28. As shown in FIG. 2, the printer 41 is rotated away from label transport 43 when this apparatus is to be used for manual operation. The human readable label from printer 41 is then caught by chute 53 and may be applied to the package manually. The Universal Product Code (UPC) label application may also be performed manually with the FIGS. 1 and 2 apparatus by the operator placing a package over aperture 54.

An alternate system for manual handling and labeling of packages with both UPC and human readable labels is shown in FIG. 3. In the FIG. 3 grouping a label or ticket printer 57 is associated with the scale 60 and receives coded weight information from it. This information also is fed to a computer 63 along with coded information representing the price per unit weight of the articles being weighed and labeled. This price information is supplied from apparatus which may be incorporated in the printer and controlled by knobs 65, or by an equivalent key board.

The label printer also includes a commodity key receptacle 67. As mentioned above, such a key provides information relating to the commodity being weighed in a form useable by the printer. Details of the printer and its use of a commodity insert key are described in the U.S. Pat. No. 3,104,806, Sept. 24, 1963, and details of such a key with coded commodity identification information are disclosed in copending application Ser. No. 573,594 filed Apr. 30, 1975. A quantity of such keys may conveniently be stored on top of printer 57 in rack 69, such as described in U.S. Pat. No. 3,238,001.

As explained in detail in U.S. Pat. Nos. 3,104,806, and 3,557,353, the scale 60, computer 63, and printer 57, cooperate to calculate the value of a particular article placed on the scale platform 70. As with the automatic arrangement of FIGS. 1 and 2, the appropriate commodity key is inserted in the printer and the price per unit weight for such commodity is entered. The printer, at the end of the value calculation, prints a human readable label (FIG. 5) on which appears figures stating the weight, price per unit weight, and value of that particular article along with the name of the commodity. In many instances it is customary to use label stock which is pre-printed with the name of the store.

Figure 5:
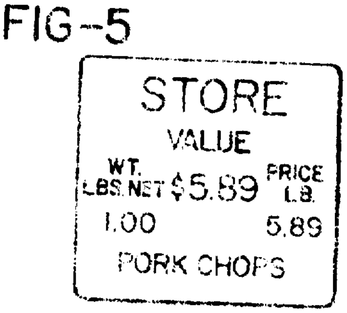
FIG. 5 shows a typical human readable label.

The label of FIG. 5 has a suitable adhesive on its reverse side and is delivered with this adhesive side facing upward into an applicator chute or holder 72, which may be of the type disclosed in U.S. Pat. No. 3,556,898. The chute incorporates a switch (not shown) which is connected as part of an interlock control for the printers. If the label is not removed from the chute, the interlock control prevents a second printing cycle. Generally, the operator when applying a label to a package with the FIG. 3 apparatus, will hold the package with its top surface facing downwardly, with one edge of the package parallel to the printer housing. Due to the length of chute 72, the label will be attached to the package at a location spaced inwardly from, and oriented with regard to, that one edge of the package.

The FIG. 3 system includes a second printer 74 which is adapted to print a UPC label and to deliver this label into a chute 76. The printer mechanism may be of the type disclosed in U.S. Pat. No. 3,866,851. The label delivery mechanism including chute 76 and associated interlock switch (not shown) is essentially identical to the same apparatus used in the printer 57. In accordance with one aspect of the invention, unless labels are removed from each of the delivery chutes 72 and 76 after a printing cycle, both printers will be inhibited. The printer 74 receives the total value information from computer 63 and converts it into a form suitable for printing the total value in UPC form. The printer 74 also receives commodity code information.

In the FIG. 3 apparatus, application of the UPC label to the package is accomplished in a manner similar to that described with respect to the human readable label. The package will be grasped with the bottom side facing downwardly and edge of the package aligned with the housing of printer 74 over delivery chute 76. The package will then be pressed against the UPC label. Since chute 76 is essentially identical to chute 72, the UPC label is applied to the bottom of the package at the same distance from the one edge of the package as the human readable label was applied. Thus with the FIG. 3 apparatus the same edge of the package is used as a reference in the application of both labels and the labels may be applied to opposite sides of the package in registration with each other.

The UPC label applicator for use in the automated system of FIGS. 1 and 2 is described more fully in FIGS. 6–20. FIG. 6 is a plan view of the applicator with portions of the conveyer rollers broken away. In FIG. 6, packages are moved from left to right, after having had the human readable label applied to the upper package surface at station 30. The conveyer, which moves packages from station 25 to station 28 and then to station 30, positions the edge of the package against guide 78. This positioning is done prior to application of the human readable label at station 30. Thus the side edge of the package provides a reference for positioning the human readable label. Since no lateral movement of the package occurs as it moves over the UPC applicator rollers, this same package edge serves as a reference for application of the UPC label. The conveyer of station 30 is shown more fully in U.S. Pat. No. 3,732,966, mentioned above.

Figure 7:
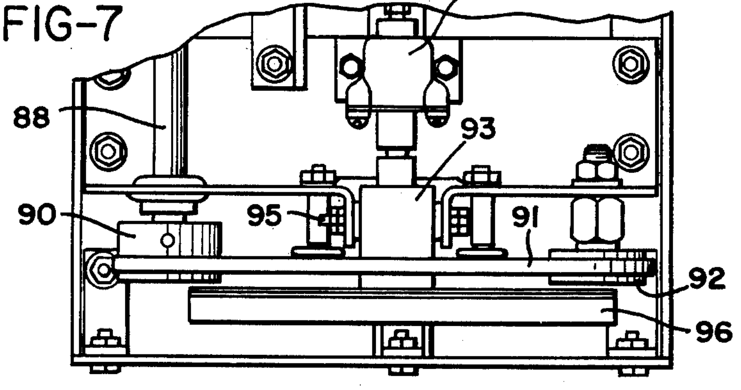
FIG. 7 is a fragmentary view of the apparatus of FIG. 6 with the conveyer rollers removed.

Movement of packages from station 30 onto the rollers 80 of the UPC applicator conveyer is generally provided for by power driver rollers 81 and 82 which are covered with a rubber-like substance to insure adequate friction between the conveyer and the package. The package then moves on the conveyer rollers 80 until it is appropriately positioned above aperture 54. As seen in FIGS. 6 and 7, power is supplied to the conveyer rollers from motor M-1 by a belt 84, pulleys 86 and 87, shaft 88, pulley 90, belt 91, and idler pulley 92. Belt 91 is positioned directly beneath the conveyer rollers and actually supports the rollers thereby providing roller rotation. A pneumatic piston C-2, which is seen also in FIG. 8, when actuated causes brake arm 93 to rotate about pivot 95 with the result that bar 96 lifts the conveyer rollers from contact with belt 91. Since the bar 96 frictionally contacts the rollers 80 and may in fact be covered with a friction increasing material such as rubber, actuation of piston C-2 results in the applicator conveyer being immediately halted.

Figure 12:
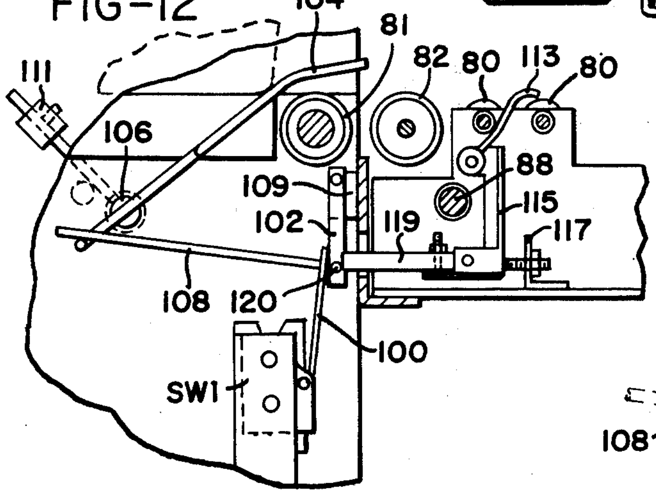
FIG. 12 is a partial view showing the package sensing arrangement.
Figure 13:
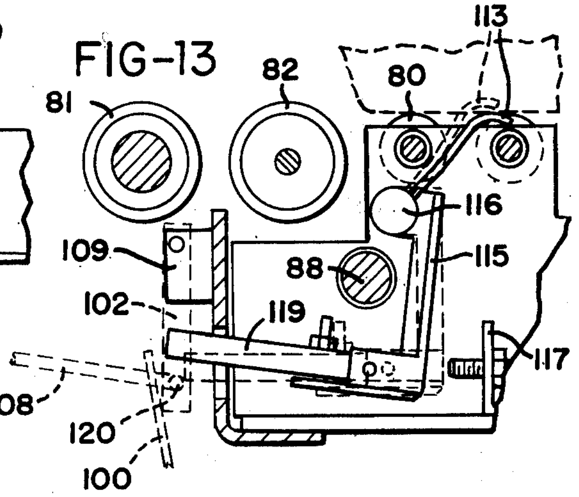
FIG. 13 is a partial sectional view showing actuation of the package sensing arrangement in the manual mode.

A means for detecting when a package on the conveyer is appropriately positioned above aperture 54 is shown in FIGS. 6, 12, and 13. As shown in FIG. 12, a switch SW1 is provided in an arrangement such that proper positioning of a package is indicated by switch actuation. A lever arm 100 of the switch SWI is spring biased to a first position, as shown in FIG. 12. This arm causes actuation of switch SW1 to occur as it moves from the first position of FIG. 12 to a second position, shown in FIG. 13. An actuator link 102, adjacent the switch lever arm 100 moves the lever arm 100 from its first position to its second position.

Since the FIGS. 1 and 2 UPC applicator, as discussed above, may be used in either an automatic or manual mode, two sensor arrangements are provided for actuation of switch SW1. In the automatic mode a first package sensing means including a trip wire 104, detects when a package coming down the conveyer moves into UPC label applying position. As the package moves over the trip wire, the wire rotates about a pivot 106, causing lever arm 108 to move upward. Lever arm 108 is rigidly fixed to actuator link 102 and therefore causes the actuator link 102 to rotate about pivot 109 with the result that switch SW1 is actuated. As the package moves into the UPC applicator conveyer, trip wire 104 is returned to its initial position by counter balance 111, allowing the switch lever arm 100 to return to its first position and signaling that the conveyer rollers should stop and that a package is positioned for application of a label. Thus a UPC label is applied to the package at a predetermined distance from the back edge of the package. Since a side edge of the package is also used as a reference in conjunction with guide 78 (FIG. 6), the location of the label on the package is completely determined.

In the manual mode of operating the FIGS. 1 and 2 label applier, a package is placed over aperture 54 by hand and its presence is sensed by a second package sensing means including trip wire 113. When the wire 113 is depressed by a package, it causes a member 115 to rotate about shaft 116, as shown in FIG. 13. As member 115 moves away from stop 117, switch lever arm 100 is moved sufficiently to actuate switch SW1, as shown in dashed lines in FIG. 13. The continued downward motion of trip wire 113 causes member 115 to rotate even further with the result that blade 119 cams over wire 120 which is attached to actuator link 102. This allows switch lever 100 to return to its first position. Thus, placing a package over aperture 54 so as to cause trip wire 113 to be depressed results in movement of switch lever arm 100 from its first to its second and then back to its first position. After the package is removed from trip wire 113, spring 122 (FIG. 6) returns the linkage of the second package sensing means to its initial position.

Referring not to FIGS. 14–18 the UPC label to be applied to the package lower surface is supplied to a label catcher 126 before being picked up by applicator 130. The UPC label is printed by printer means 124 which, for instance, be of the type disclosed in U.S. Pat. No. 3,866,851 and Pat. No. 3,874,288. The label is typically printed on stock consisting of a series of blank labels carried on a strip of backing material. Each such label has its back side coated with a pressure sensitive adhesive and is peeled from the backing material, by the printer after the UPC code is printed, in a conventional manner. As the label is peeled from its backing, a three belt transport 132, shown in FIG. 18, engages the label and carries it to label catcher 126. The label is carried with the adhesive side facing upwardly and the belt 134 is coated with a release agent to prevent the label from sticking. A pair of lower belts 136 act in concert with the upper belt 134 to grip the label and eject it into label catcher 126. Belts 136 are positioned slightly below and to each side of belt 134 so that the labels are held in a curved cross-section condition of increased front to back rigidity between belt 134 and belts 136.

Figure 16:
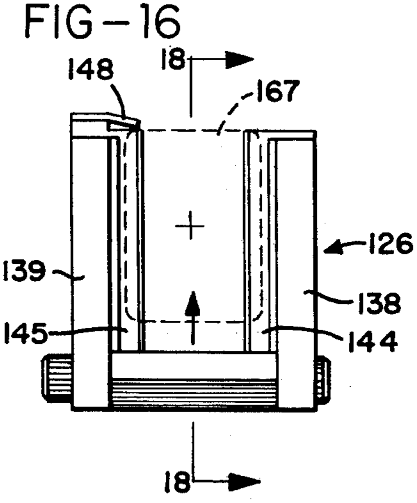
FIG. 16 is a plan view of the label catcher and holder arrangement.
Figure 17:
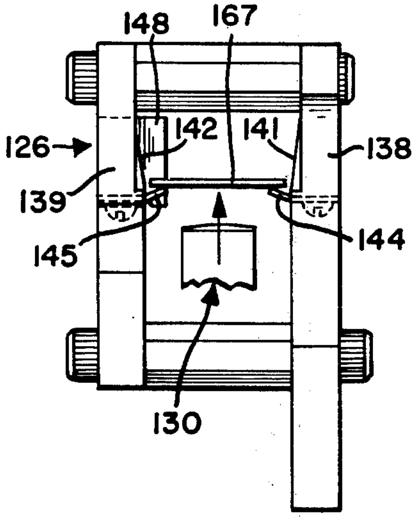
FIG. 17 is a detail view of the label catcher taken generally on line 17—17 in FIG. 15.
Figure 18:
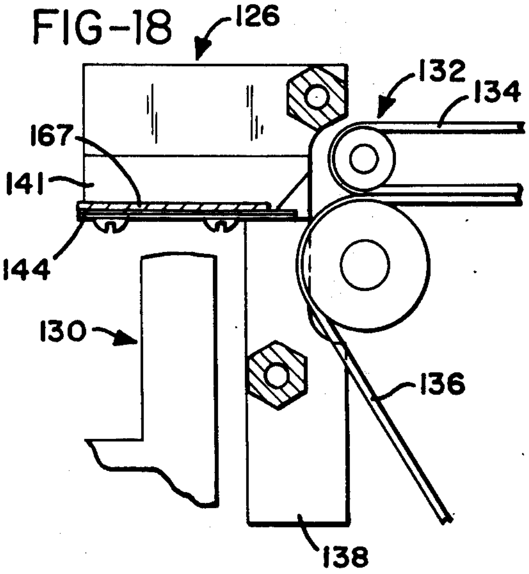
FIG. 18 is a fragmentary section of the label catcher arrangement taken on the line 18—18 of FIG. 16.

As shown in FIGS. 16 and 17, the label catcher consists of right and left guide wall means 138 and 139, respectively. These guide wall means are separated from each other by a distance slightly greater than the width of a label and have their inner surfaces 141 and 142 slightly tapered, tending to converge toward the bottom of the walls. Right and left label support means 144 and 145 are positioned beneath the guide walls and form knife edge surfaces running adjacent the guide walls for supporting a label near its periphery. A label stop means 148 (FIG. 16) is positioned at the end of the guide walls for preventing a label from flying beyond the guide walls as it is ejected from the printer.

Figure 8:
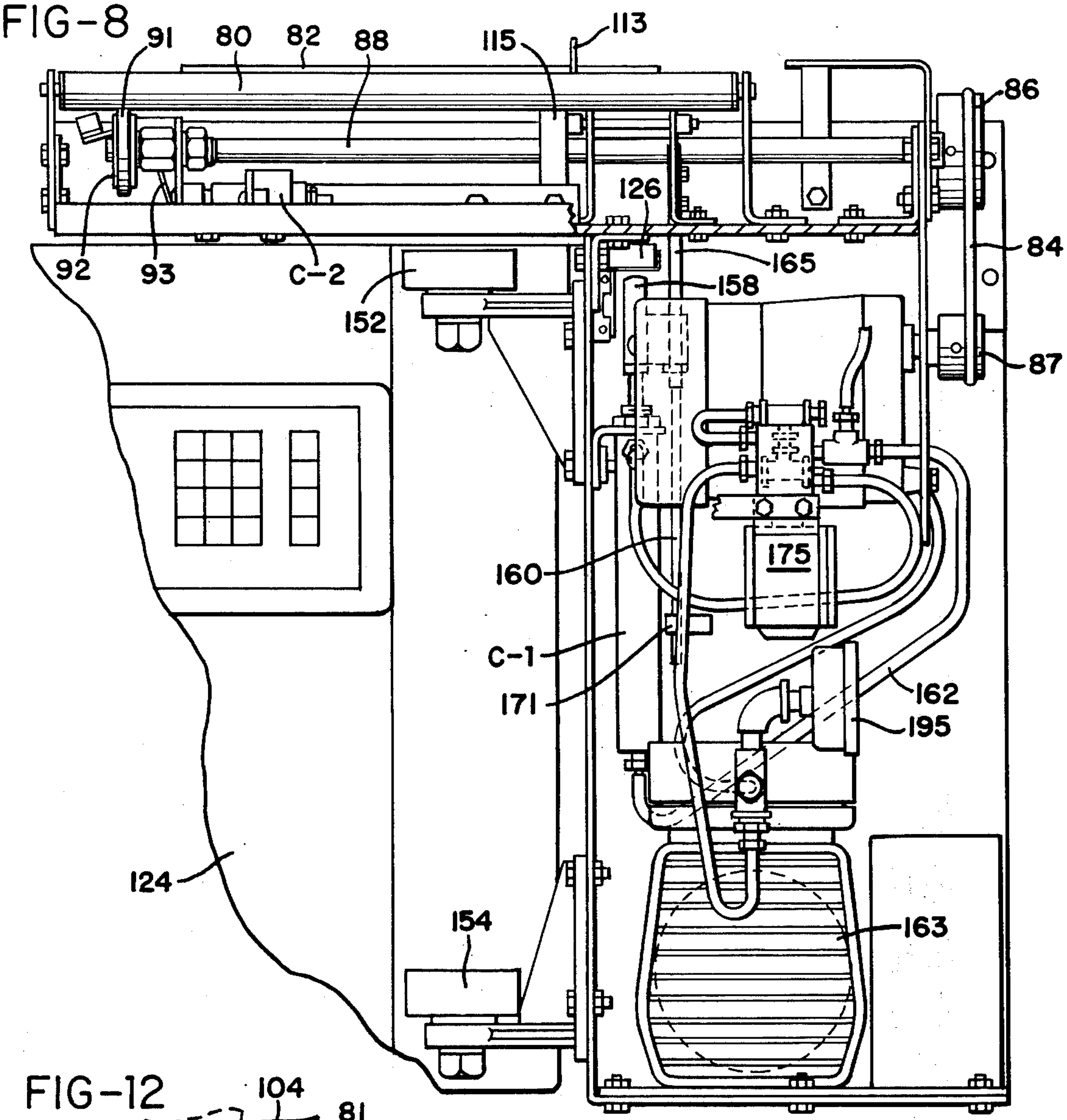
FIG. 8 is a view of the applicator apparatus looking from the discharge end with the end cover removed.
Figure 14:
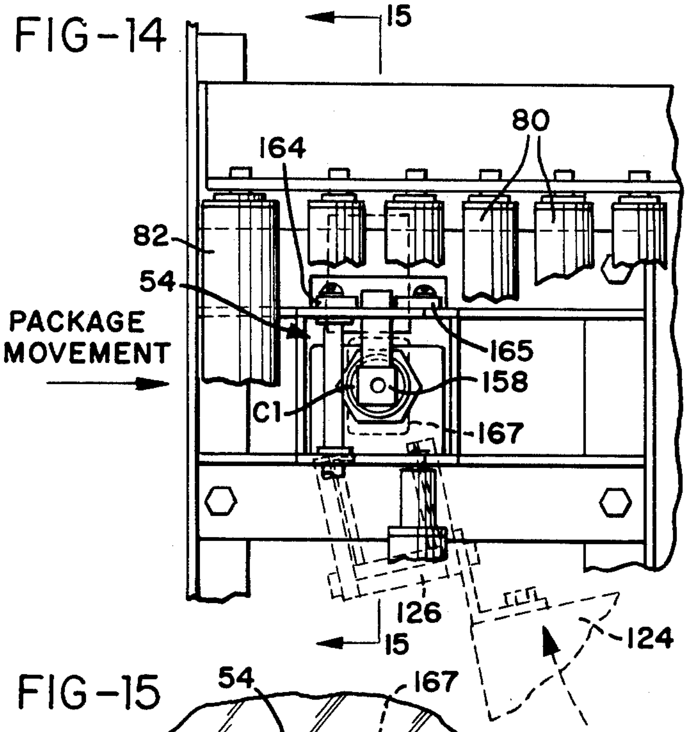
FIG. 14 is a partial plan view showing details of the label applicator.

As seen in FIGS. 16 and 17, the right and left label support means define an opening through which applicator head 158 can move. The applicator head 158 engages the UPC label as it moves upwardly through the aperture 54 to the positions shown by the dash lines in FIG. 15. As seen in FIG. 8, the UPC printer 124 is attached to the applicator frame by hinges 152 and 154 and may be rotated outwardly for servicing. The label catcher 126 is attached to the printer and is arranged to rotate into position above the applicator means 130 as shown in FIG. 14.

Figure 9:
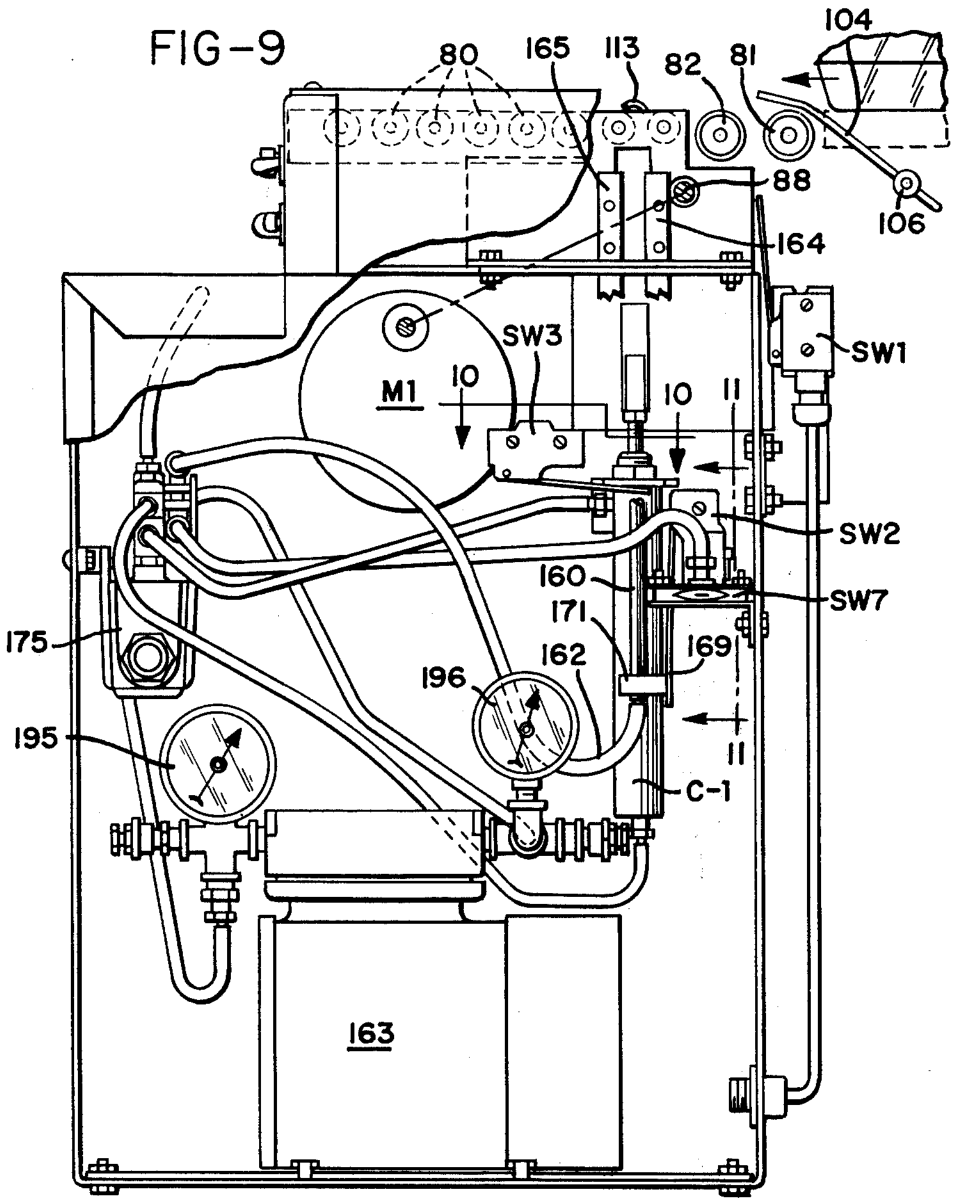
FIG. 9 is a view of the applicator with parts broken away, looking along line 9—9 shown in FIG. 6.
Figure 15:
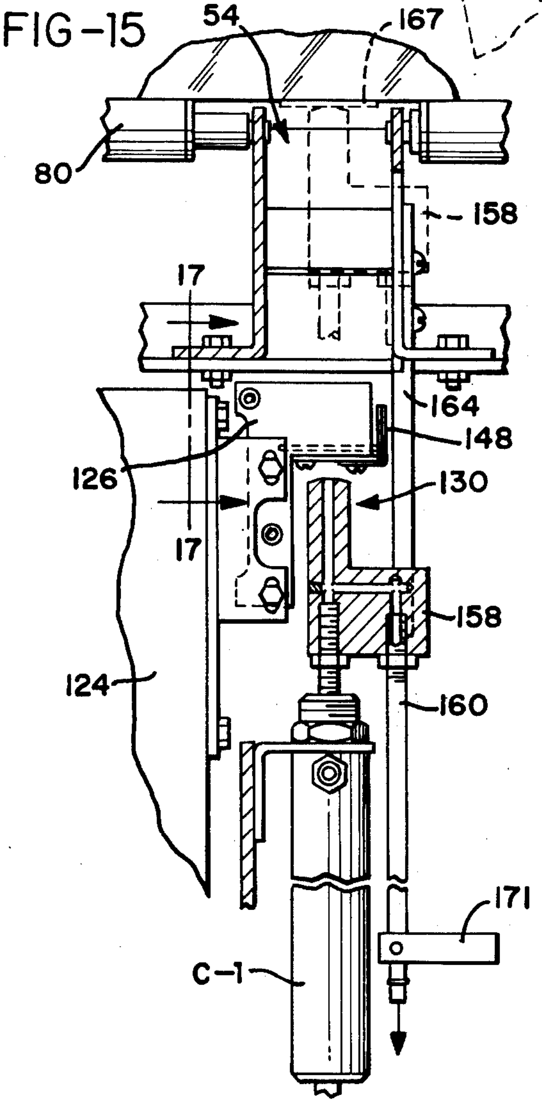
FIG. 15 is a partial view from the discharge end of the apparatus with portions in section, taken generally along line 15—15 in FIG. 14, showing the label applicator.

As best seen in FIGS. 8, 9, 14, and 15, the label applicator means 130 comprises a motor of the pneumatic cylinder type, the cylinder C-1 is capable of moving the applicator nozzle or head 158 upwardly, through label catcher 126, to the position shown by dash lines in FIG. 15. As seen in FIG. 15, the nozzle 158 is attached to tube 160 and also to a vacuum line 162 (FIG. 9). The vacuum line receives vacuum from pump-compressor 163 and is attached to the tube 160 so that sufficient suction is generated at the nozzle 158 to grasp a label. Right and left guides 164 and 165 act to guide the nozzle during the extension and retraction of cylinder C-1.

When the plunger of cylinder C-1 has completely extended and the nozzle has applied a label to the bottom of a package, pressure in the vacuum line 162 is momentarily reversed to insure that the label is removed from the nozzle and to aid in clearing dust from the vacuum parts. The nozzle is somewhat smaller than the UPC label 167 (shown by dashed lines in FIG. 14) so that the pressure sensitive label is initially firmly pressed against the package only at the center of the label. However, after the application of a label, the package is moved along the applicator conveyer and the label is thus firmly applied by the action of the conveyer rollers and the package weight.

In the preferred embodiment of the invention it is found desirable to interlock the human readable and machine readable label printers in a manner which prevents application of a machine readable UPC label to a package having no human readable label or a different value human readable label. It is found to be disturbing to purchasers if the UPC checkout scanner registers value for a package having no human readable label or an incorrect human readable label.

Figure 10:
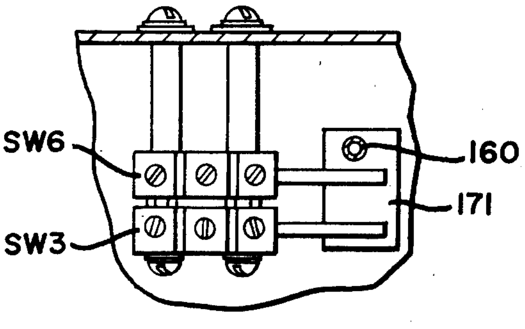
FIG. 10 is a fragmentary view taken along section line 10—10 of FIG. 9.
Figure 11:
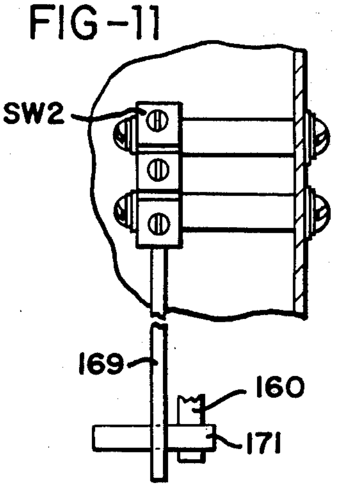
FIG. 11 is a fragmentary view taken along section line 11—11 of FIG. 9.

FIGS. 9, 10, and 11 show the physical positioning of various electrical switches used in the control circuit and the pneumatic circuit. Switch SW1 senses the appropriate position of a package above the label applicator, as was described in connection with FIGS. 12 and 13 of the drawings. Switch SW2 includes a long lever actuator 169 which is biased into contact with block 171. As the applicator extends upward, tube 160 moves block 171 upward and arm 169 causes switch SW2 to close. Switch SW3 and switch SW6 are mounted together as shown in FIG. 10 and are actuated by the complete extension of the applicator cylinder C-1. Switch SW6 signals the printer 41 that a label has been taken in much the same manner as the switch described in conjunction with chute 76 shown in FIG. 3. Vacuum switch SW7 senses the pressure in the vacuum line 162 and opens if the pressure rises above a predetermined threshold level. Pump-compressor 163 supplies the pressure and vacuum need to operate the system and is powered by a motor M-2 (not shown). A solenoid operated valve 175 controls application of pressure and vacuum to the pneumatic components.

Figure 19:
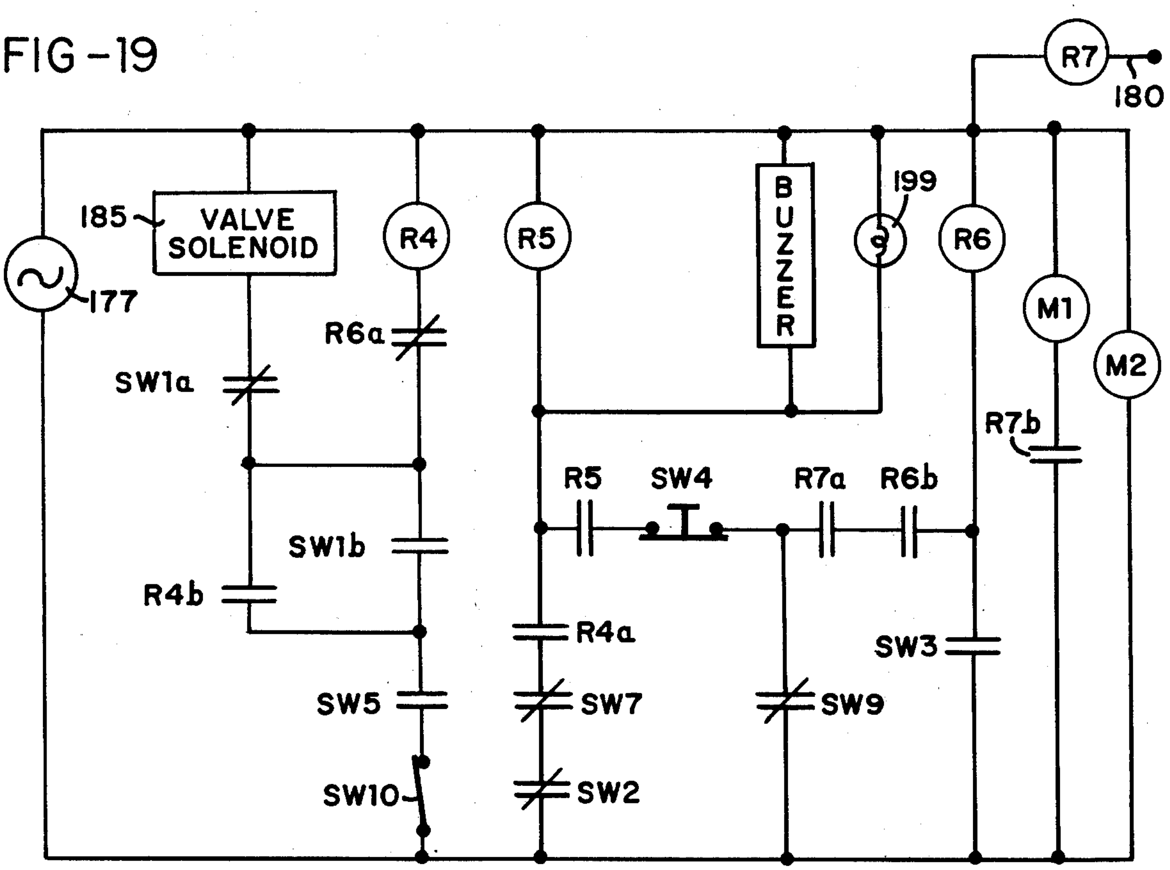
FIG. 19 shows the electrical control schematic for the label applicator.
Figure 20:
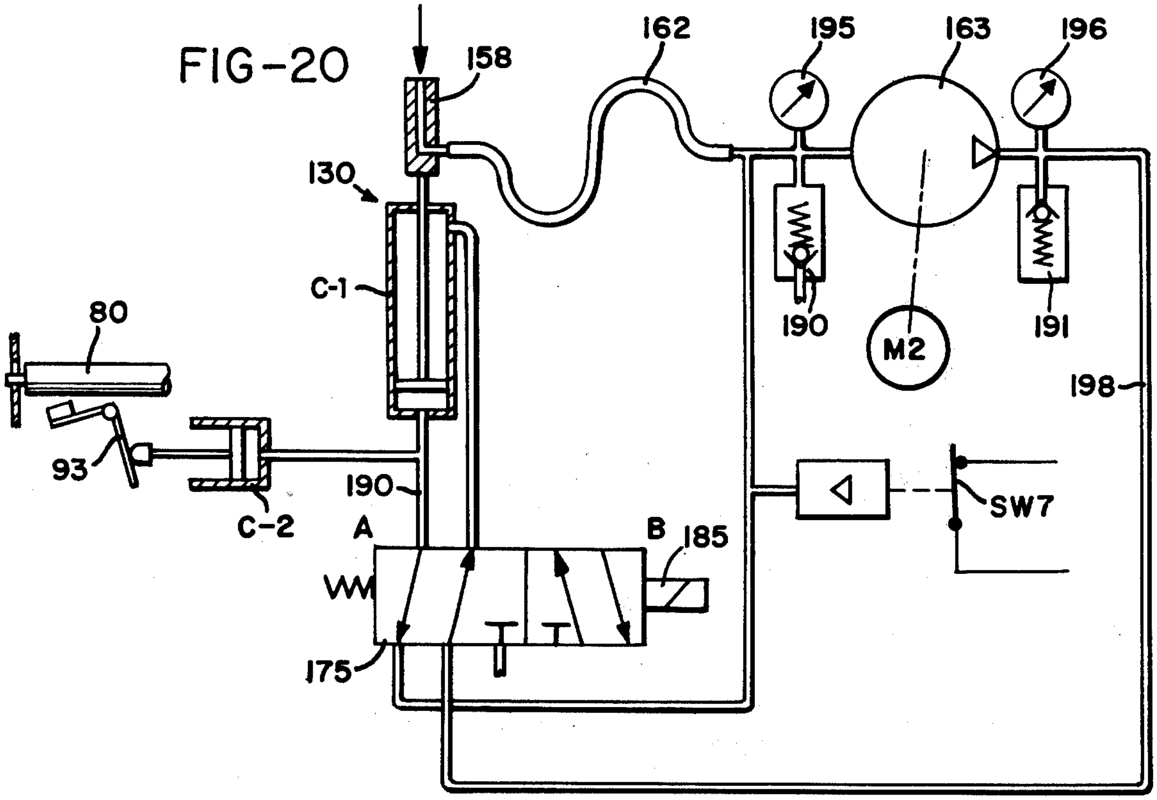
FIG. 20 is a pneumatic diagram of the label applicator.

FIGS. 19 and 20 show schematic diagrams of the electrical and pneumatic controls for the UPC label applicator of FIGS. 1 and 2. In the automatic operating mode, the sequence of the steps during a normal operating cycle is as follows. Power is supplied to the electric circuit by power source 177. Relay coil R7 is energized by the application of power to node 180 which connects with the power source for the conveyer associated with the stations 25, 28 and 30 in FIG. 1. Completing the circuit to node 180 indicates that the conveyer system is operating. Contacts R7*a* and R7*b* will be closed upon completing the circuit to node 180. This causes the conveyer motor M1 associated with applying station 32 to run. As a package moves onto the label applicator conveyer, switch SW1*b* will be closed and switch SW1*a* will be opened; this causes relay coil R4 to be energized, locking in the relay through normally open contacts R4*b*. Contacts R4*a* will also be closed. When the package is completely onto the label applicator conveyer and positioned properly over the applicator aperture, switch SW1*a* will re-close, switch SW1*b* will re-open and power will be applied to the pneumatic valve solenoid 185 via switch SW1*a*, contacts R4*b*, switch SW5 and switch SW10. Switch SW5 is a safety switch which is closed only when the printer cabinet is closed. Switch SW10 is a toggle switch which, when opened, allows the applicator conveyor to be operated while preventing UPC labels from being applied.

As the valve solenoid 185 of FIG. 19 is actuated, the valve porting which is shown schematically at 175 in FIG. 20 shifts into position B with the result that cylinder C-1 begins an upward stroke as pressure is applied to its base from line 198 through line 190. At the same time, cylinder C-2 is actuated and the conveyer rollers 80 are disengaged from the conveyer motor M1 by the rotation of arm 93. Contacts R4*a* were closed at the same time that the valve solenoid 185 was actuated, no power was applied to relay coil R5, however, since switch SW2 is held open as long as cylinder C-1 is in its down position. As the plunger of cylinder C-1 moves upward, the applicator nozzle 158 encounters a UPC label, this label is grasped and held on the applicator nozzle 158 by the vacuum from line 162. When the label covers the aperture of nozzle 158 the vacuum in the vacuum line 162 increases and the vacuum switch SW7 is opened. The cylinder C-1 continues to move upward thereafter allowing switch SW2 to be closed. Since, however, the vacuum switch SW7 was open prior to switch SW2 closing, relay coil R5 and the buzzer and light error indicator 199 in parallel with this relay coil are not energized.

When the plunger of cylinder C-1 reaches the top of its application stroke, relay coil R5 is energized by the closure of switch SW3. R6 locks itself closed through contacts R6*b*, R7*a* and switch SW9. Contacts R6*a* are opened upon closure of R6 with the result that relay coil R4 is deenergized. Power of the valve solenoid 185 is removed by the opening of contacts R4*b*. Contacts R4*a* are also opened. Upon removing power to valve solenoid 182 the pneumatic valve 175 shifts into its A position, applying pressure to the top of the cylinder and exhausting the bases of the cylinders C-1 and C-2 into the vacuum line. As a result of exhaust from the base of cylinder C-1 momentarily "flooding" the vacuum system with air as the plunger of C-1 moves downward a short blast of outward moving air is applied through the applicator nozzle 158, purging the nozzle of foreign substances and insuring that the label is freed from the nozzle. When the cylinder C-1 returns to its down position, normally closed switch SW2 is opened, vacuum switch SW7 closes as the vacuum line pressure increases after the application of the label, and cylinder C-2 retracts completely allowing the applicator conveyer to run.

Switch SW9 is mechanically linked to the conveyer associated with the scale so as to be periodically opened. When this occurs R6 is deenergized, and the system is completely reset. The locking in functions of relay coil R6 is employed (when the system is in the automatic mode) to prevent accidantal retripping of the circuit by a light package being sufficiently jarred during label application to bounce off the conveyer and land on the sensor 113 used for manual label application.

The sequence of steps of the FIGS. 19 and 20 apparatus during a normal operating cycle in the manual operating mode is as follows. Relay coil R7 will not be energized, since the scale conveyer is inoperative. Contacts R7*a* and R7*b* will therefore be open. The package to be labeled will be placed manually over the applicator aperture 54 causing switch SW1*b* to close and switch SW1*a* to open. This energizes relay coil R4, and its locking contacts R4*b* and also closes contacts R4*a*. Switch SW1*a* will then close and switch SW1*b* will open as the switch actuator arrangement, described above in regard to FIGS. 12 and 13, completes its package actuated cycle. The pneumatic valve solenoid 185 will therefore be energized and the plunger of cylinder C-1 will extend, as described in connection with the automatic mode of operation. When the cylinder C-1 plunger reaches the top of its application stroke, switch SW3 will be closed, energizing relay coil R6 and therefore deenergizing relay coil R4 by opening contacts R6*a*. The pneumatic valve 175 will therefore return to its A position and the cylinder C-1 plunger will retract after a short blast of air is applied through the applicator nozzle 158.

Provision is made in the automatic node of the operating the FIGS. 19 and 20 apparatus for detecting when a UPC label is not available to be applied to a package. As the cylinder C-1 begins an upward stroke, if the applicator nozzle does not pick up a UPC label, vacuum switch SW7 will not be opened. As a result, when the cylinder C-1 is extended, power will be applied to relay coil R5 through the series electrical connection of contacts R4*a* which are closed when the applicator is conditioned to operate, switch SW7 which is closed when the pressure in the vacuum line indicates that no label has been grasped, and switch SW2 which closes as the applicator approaches its extended position. This circuit will cause the pilot light and buzzer to be energized indicating an error condition. Relay coil R5 then will lock itself closed through contacts R5, switch SW4, and switch SW9. This error indication will persist until switch SW9 is opened during the next scale conveyer timing cycle. Thus, the UPC label applicator will only momentarily indicate an error condition and this indication may be ignored by the operator when it is not repeated if desired. The error indication could of course be arranged to give a continuous signal by the use of a self-latching relay if desired.

An error condition is detected in exactly the same manner when the FIGS. 19 and 20 system is operated in the manual mode, with the exception that switch SW9 will not be intermittently opened. The error indicators will therefore continuously indicate an error until the circuit is manually reset by switch SW4, which may be a switch of the push button variety.

Motor M2 is the compressor motor and is connected to operate in either the manual or automatic mode. Check valves 190 and 191 are provided to limit the pressure and vacuum supplied by pump-compressor 163; by opening at predetermined vacuum and pressure levels respectively these values assure the availability of both pressure and vacuum from the single chamber pump-compressor 163. (The bleed air admitted by valve 190 provides pressure in line 198 in addition to air admitted by the remainder of the vacuum circuit and conversely pressurized air released by valve 191 results in negative pressure in the vacuum system. Gauges 195 and 196 are provided to monitor the pressure in these lines.

While the form of method and apparatus herein described constitutes a preferred embodiment of the invention, it is to be understood that the invention is not limited to these precise forms and that changes may be made therein without departing from the scope of the invention.

What is claimed is:

1. In an apparatus for applying a label having one adherent surface to the bottom of a package and including:

conveyor means for moving a package into proper position over an aperture, sensing means responsive to proper package position, printer means for printing and ejecting a label, catcher means for holding each label after ejection, applicator means for conveying said label from said catcher means through said aperture to the bottom of said package, an improved catcher means comprising:

opposed guide walls separated by a distance slightly greater than the width of a label, the inner surfaces of said guide walls being slightly tapered converging toward the bottom of said guide walls, opposed label support means located beneath said guide walls and forming two knife edge surfaces adjacent said guide walls and spaced closer than said guide walls for supporting an ejected label received between said guide walls, and stop means for terminating ejection travel of said label in said catcher over said support means and said applicator means.

2. In a label application system wherein a printed label having one side coated with pressure sensitive adhesive is provided by a printer with the adhesive coated side facing upwardly and wherein said label is applied through an aperture in a conveyor line to the bottom of a package on said conveyor line by an applicator, an intermediate label catcher for positioning and holding said label beneath said aperture after said label is ejected from said printer until said label is picked up by said applicator; comprising spaced apart guide wall means separated by a distance slightly greater than the width of a label and aligned with said printer for guiding a label between said guide wall means as said label is ejected from said printer, label stop means positioned at the end of said guide wall means for preventing an ejected label from moving beyond said guide wall means, and label support means positioned beneath and slightly inward of said guide wall means for supporting said label near its periphery until said label is picked up by said applicator, said label support means defining an opening through which said applicator moves to pick up said label as said applicator extends to apply said label to a package through said aperture.

3. Apparatus for applying different but related adhesive coated labels to the top and bottom of a package comprising:

conveyer means for moving a package into first and second positions for application of the labels, said conveyer means having an aperture over which a package is located when in said second position, position sensing means for determining when said package is properly positioned in said second position, printer means for printing and ejecting the labels, applicator means taking said labels from said printer means and applying one label to the top of the package and the related label to the bottom of said package through said aperture, said applicator means being responsive to said position sensing means to permit application of a label through said aperture when a package is properly located at said second position.

* * * * *

UNITED STATES PATENT AND TRADEMARK OFFICE
CERTIFICATE OF CORRECTION

PATENT NO. : 3,985,605
DATED : October 12, 1976
INVENTOR(S) : Fritz F. Treiber & Dallas A. Margraf It is certified that error appears in the above-identified patent and that said Letters Patent are hereby corrected as shown below:

Column 4, line 48 "with" should be --when--.

Column 6, line 62 "SWI" should be --SW1--.

Column 7, line 48, after "which" should be --may--.

Column 9, line 65, "R5" should be --R6--.

Column 10, line 24, "accidantal" should be --accidental--.

Figure 5 should appear as shown on the attached sheet.

Signed and Sealed this
Fifth Day of April 1977

[SEAL]

*Attest:*

RUTH C. MASON
*Attesting Officer*

C. MARSHALL DANN
*Commissioner of Patents and Trademarks*